United States Patent Office 3,474,166
Patented Oct. 21, 1969

3,474,166
MOLD RELEASE COMPOSITION
Edward V. Babcock, Fullerton, Calif., assignor to United States Borax & Chemical Corporation, Los Angeles, Calif., a corporation of Nevada
No Drawing. Filed Sept. 28, 1966, Ser. No. 582,524
Int. Cl. B29c 1/04; C04b 35/68
U.S. Cl. 264—338
10 Claims

ABSTRACT OF THE DISCLOSURE

A mold release composition, particularly suitable for use in molding plastic or rubber articles comprises an aqueous dispersion of an organophilic hectorite clay, an alkali metal carbonate or ammonium carbonate and a surfactant. The composition does not adhere to the article being molded and does adhere to the mold sufficiently to permit multiple molding operations without requiring fresh applications of the composition to the mold before each molding operation.

---

This invention relates to mold release compositions. More particularly, this invention relates to mold release compositions comprising hectorite modified clay and certain adjuvants.

The casting of plastic articles presents different problems from those pertaining to the casting of metal articles. Since the temperature conditions in casting, injection molding and compression molding are considerably lower than those found in metal molding, the cooling cycle is accomplished much more quickly. Thereby, molds can be opened for removal of the produced article almost immediately after completing the cure cycle of the molds. Once the article has been removed from the mold, it is desirable from a production cost standpoint to rapidly utilize the mold for the next operation with as little delay as possible.

It has been found that two main steps effect the speed in preparing the mold for the next cycle. The first one concerns the rapidity with which one can open the mold to release the molded article therefrom. If it is necessary to gingerly open the mold to permit the article to release itself from the mold under tension producing conditions, such as occurs when the product sticks to the mold, much time will be consumed before the mold is put in a ready condition. More obviously, in conserving time, is the possibility of insuring that the mold has sufficient mold release coating for more than one molding cycle. Many known mold release agents must be applied after each molding cycle. The need for including this step presents a time-delaying problem.

Accordingly, the present invention relates to a mold release composition having unique properties in achieving good mold release. Furthermore, it has the attribute of re-use through numerous molding operations.

Broadly, the invention comprises a mold release composition comprising a hectorite modified clay, a surfactant and a carbonate selected from the group consisting of alkali metal carbonates and ammonium carbonate. Applicable surfactants are alkali metal alkylaryl sulfonates, alkanolamine alkylaryl sulfonates, alkyl sulfates and alkali metal soaps. The preferred surfactant is sodium dodecylbenzene sulfonate. Other specific applicable surfactants are: sodium lauryl sulfate, triethanolamine alkylaryl sulfonate and sodium oleate soap.

More specifically, the hectorite modified clay is in the range of 2–15% by weight; with 4–8% the preferred range; the carbonate is in a range of 0.5–3% by weight, with 1–2% the preferred range; the surfactant is in a range of 0.01–2% with 0.05–0.5% the preferred range; and the balance being water.

An applicable hectorite modified clay is one sold under the trademark Propaloid-T by National Lead Company. The clay is modified by replacing an exchangeable sodium with an organic cation to make the clay organophilic. The clay is a sodium exchangeable magnesium litho fluoro silicate occuring only in the Mojave Desert in California. Also applicable are the modified clays disclosed in U.S. Patents Nos. 2,951,087 and 2,966,506; the information contained in these two patents is incorporated by reference.

In order to illustrate more clearly the manner of carrying out the present invention and the nature of the products thereof, the following examples are presented:

EXAMPLE I

|  | Percent by weight |
|---|---|
| Propaloid-T | 4.75 |
| Ammonium carbonate | 1.85 |
| Na dodecylbenzene sulfonate | 0.24 |
| Water, balance. |  |
|  | 100.00 |

The Propaloid-T being highly dispersible may be easily dispersed in a quantity of water containing the already dissolved ammonium carbonate and sodium dodecylbenzene sulfonate.

The resulting product was used as a mold release agent in the production of odd-shaped intricate foamed polystyrene molded parts. The mold release composition was applied with a rectangular sponge onto a Teflon coated aluminum mold and an aluminum mold which was not coated with Teflon but was highly polished. It was possible to obtain at least three molding operations before re-coating.

When using the mold release composition, it is not necessary to wash or remove any residue that remains on the molded object after molding. This is important when the molded articles are to be painted, silk screened, pasted with labels etc.

The mold release composition has found special use as a coating for tire recapping operations. The coating leaves the recapped tire with a more natural rubber look than heretofore was possible with other types of mold release agents.

The mold release composition can be used in an automated operation using spraying techniques as means for applying the coating composition.

EXAMPLE II

The following formulations has been found to be particularly efficacious in tire recapping operations:

|  | Grams |
|---|---|
| Propaloid-T | 190.00 |
| Surfactant | 12.87 |
| Ammonium carbonate | 75.70 |
| Water | 3785.00 |
|  | 4063.57 |

EXAMPLE III

The organophilic hectorite clay used in this example was prepared from grit-free Wyoming sodium bentonite. The clay, as a dispersion, was passed downward through a 3 inch diameter by 5¼ inch high bed of an exchange resin in the acid form at a rate of about 3 liters per hour. The effluent slurry was centrifuged to remove water and the resulting concentrated solids were dried on a steam bath, ground on a ball mill, and sieved.

A 40 gram sample of the oven-dried hydrogen bentonite having a particle size of less than 200 mesh was placed in a container with 320 ml. of freshly distilled isoprene. Using a Soxhlet extraction apparatus, the crude complex was extracted with benzene until all benzene soluble material had been removed. After removing solvent from the solids there was obtained 140 grams of the fine powdered organo-clay complex. The resultant was used in the following formulation:

| | Percent by weight |
|---|---|
| Resultant clay | 15.00 |
| Ammonium carbonate | 0.05 |
| Na lauryl sulfate | 0.12 |
| Water, balance. | |
| | 100.00 |

EXAMPLE IV

The organophilic hectorite clay used in this example was prepared from a Wyoming bentonite clay. As a 2½% clay solids slurry, the material was passed through a 2 cubic foot fixed bed ion-exchange column containing a commercial sodium exchange resin known as Amberlite IR–120. The clay slurry was fed through the ion-exchange column at the rate of 2 gallons per minute. The base exchange capacity of the clay was determined by the ammonium acetate method and found to be 98 ml./ 100 grams with sodium ions comprising 95% of the exchangeable bases, the remaining exchangeable ions being calcium and magnesium. Twenty gallons of this centrifuged, ion-exchange treated slurry containing 4.29 lbs. of clay was thoroughly mixed with a dilute aqueous dispersion containing 3.29 lbs. of dimethyldioctadecyl ammonium chloride, had a mole combining weight of 600 and was 75% active quaternary ammonium chloride. The amount of quaternary salt used was calculated to produce an organic-modified clay complex having 98 ml. of amine per 100 grams of clay and thus theoretically completely satisfy the base exchange capacity of the clay as determined by the ammonium acetate method. The well flocculated organic-modified clay complex formed by the reaction of the clay and quaternary salt was filtered, washed, dried, and ground to produce a finely powdered product.

| | Percent by weight |
|---|---|
| Resultant clay | 2.00 |
| Ammonium carbonate | 3.00 |
| Na oleate soap | 0.06 |
| Water, balance. | |
| | 100.00 |

EXAMPLE V

| | Percent |
|---|---|
| Propaloid–T | 6.00 |
| Ammonium carbonate | 2.00 |
| Triethanolamine alkylaryl sulfonate | 0.24 |
| Water, balance. | |
| | 100 |

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A mold release composition comprising not more than 15% by weight of an organophilic hectorite clay, not more than 3% by weight of a carbonate selected from the group consisting of alkali metal carbonate and ammonium carbonate not more than 2% by weight of a surfactant selected from the group consisting of alkali metal alkylaryl sulfonates, alkanolamine alkylaryl sulfonates, alkyl sulfates and alkali metal soaps, and the balance water.

2. A mold release composition as claimed in claim 1 wherein the surfactant is an alkali metal alkylaryl sulfonate.

3. A mold release composition as claimed in claim 2 wherein the surfactant is sodium dodecylbenzene sulfonate.

4. A mold release composition as claimed in claim 1 wherein the carbonate is ammonium carbonate.

5. A mold release composition as claimed in claim 4 wherein the surfactant is sodium dodecylbenzene sulfonate.

6. A mold release composition as claimed in claim 1 wherein the clay comprises at least 2% by weight, the carbonate at least 0.5% by weight, the surfactant at least 0.01% by weight and the balance water.

7. A mold release composition as claimed in claim 6 wherein the clay comprises 4–8% by weight, the carbonate 1–2% by weight, the surfactant 0.05–0.5% by weight and the balance is water.

8. A mold release composition as claimed in claim 1 wherein the clay comprises 4.75% by weight, the carbonate is ammonium carbonate and comprises 1.85% by weight, the surfactant is sodium dodecylbenzene sulfonate and comprises 0.24% by weight and the balance is water.

9. A separable mold having a coating therein consisting of 2–15% by weight of an organophilic hectorite clay, 0.5–3% by weight of a carbonate selected from the group consisting of alkali metal carbonates and ammonium carbonate, 0.01%–2% of a surfactant selected from the group consisting of alkali metal alkylaryl sulfonates, alkanolamine alkylaryl sulfonates, alkyl sulfates and alkali metal soaps and the balance water.

10. A method of molding articles comprising coating a separable mold with a composition consisting of 2–15% by weight of an organophilic hectorite clay, 0.5–3% by weight of a carbonate selected from the group consisting of alkali metal carbonates and ammonium carbonate, 0.01–2% of a surfactant selected from the group consisting of alkali metal alkylaryl sulfonates, alkanolamine alkylaryl sulfonates, alkyl sulfates and alkali metal soaps and the balance water, closing said coated mold, charging said mold with moldable material, opening said mold after said article has been molded, and removing said article from said mold.

References Cited

UNITED STATES PATENTS 3,284,248  11/1966  Rumberger _____ 264—338

FOREIGN PATENTS 847,723  9/1960  Great Britain.

DONALD J. ARNOLD, Primary Examiner

L. HAYES, Assistant Examiner

U.S. Cl. X.R.

106—38.22, 38.24; 117—5.3